Oct. 13, 1964 C. R. HARDWIDGE 3,152,788
LAWN WEED EXTRACTOR AND WEED EJECTOR IMPLEMENT
Filed May 23, 1963 2 Sheets-Sheet 1
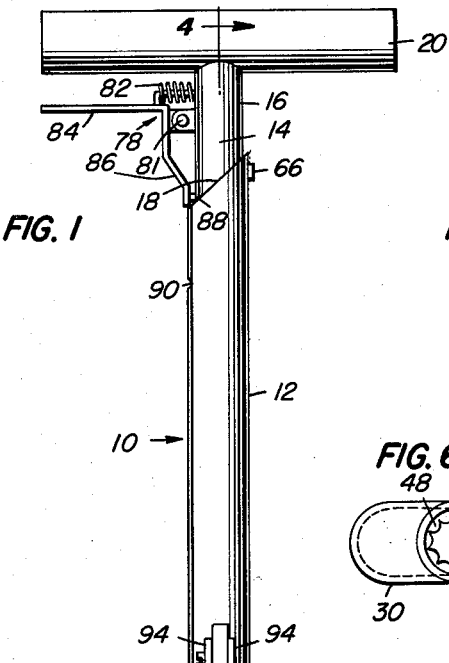
FIG. 1
FIG. 2
FIG. 6
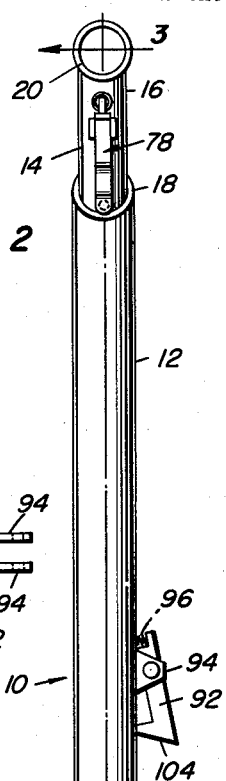
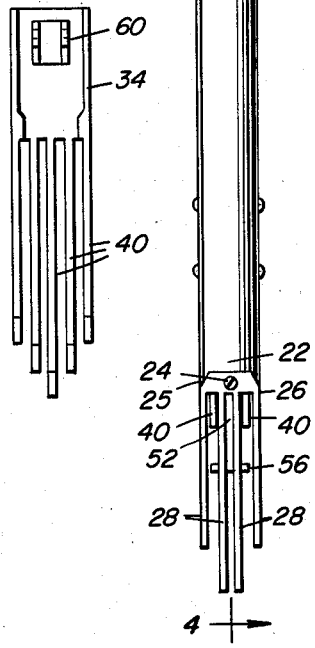
FIG. 7
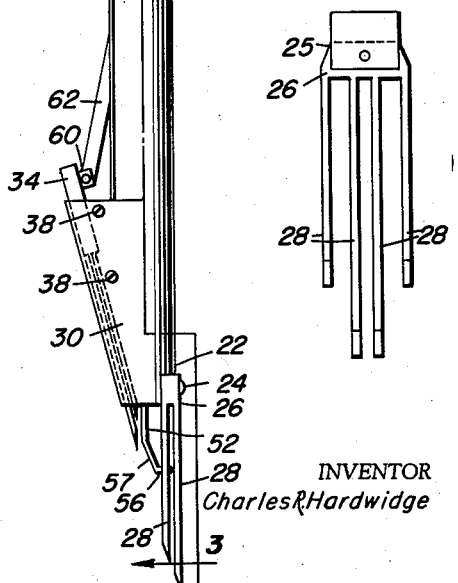
FIG. 8
INVENTOR
Charles R. Hardwidge
BY
ATTORNEY Oct. 13, 1964 C. R. HARDWIDGE 3,152,788
LAWN WEED EXTRACTOR AND WEED EJECTOR IMPLEMENT
Filed May 23, 1963 2 Sheets-Sheet 2

INVENTOR
Charles R. Hardwidge
BY Gustave Miller
ATTORNEY

United States Patent Office 3,152,788
Patented Oct. 13, 1964

3,152,788
LAWN WEED EXTRACTOR AND WEED
EJECTOR IMPLEMENT
Charles R. Hardwidge, 231 7th St. NE.,
New Philadelphia, Ohio
Filed May 23, 1963, Ser. No. 282,797
4 Claims. (Cl. 254—132)

This invention relates to a lawn weed extractor and weed ejector implement and has for an object to provide an improved hand implement for extracting a weed and its roots from a lawn and for then ejecting the weed from the implement without manually touching the weed or its roots.

A further object of this invention is to provide a lawn weed eliminating implement which may be manipulated rapidly to both extract the lawn weed and then eject the weed, all without manual contact with the weed or its roots.

Still a further object of this invention is to provide a lawn weed eliminating tool which may be operated with the operator in a standing rather than a kneeling position.

Yet a further object of this invention is to provide a lawn weed eliminator which will easily and quickly extract both the weed and all its roots and then may readily eject the extracted weed and its roots therefrom to a desired disposal location.

With the foregoing and other objects in view, this invention comprises the combination, construction and arrangement of parts hereinafter set forth, claimed, and disclosed in the accompanying drawings wherein:

FIG. 1 is an elevational view of the weed extractor implement of this invention, viewed on the fixed fork side thereof;

FIG. 2 is a view of the left side of FIG. 1;

FIG. 6 is a bottom end view of the outer tube with the slidable fork housing and guide thereon;

FIG. 7 is an elevational view of the slidable fork and its tines;

FIG. 8 is an elevational view of the fixed fork and its tines.

Figure 3:
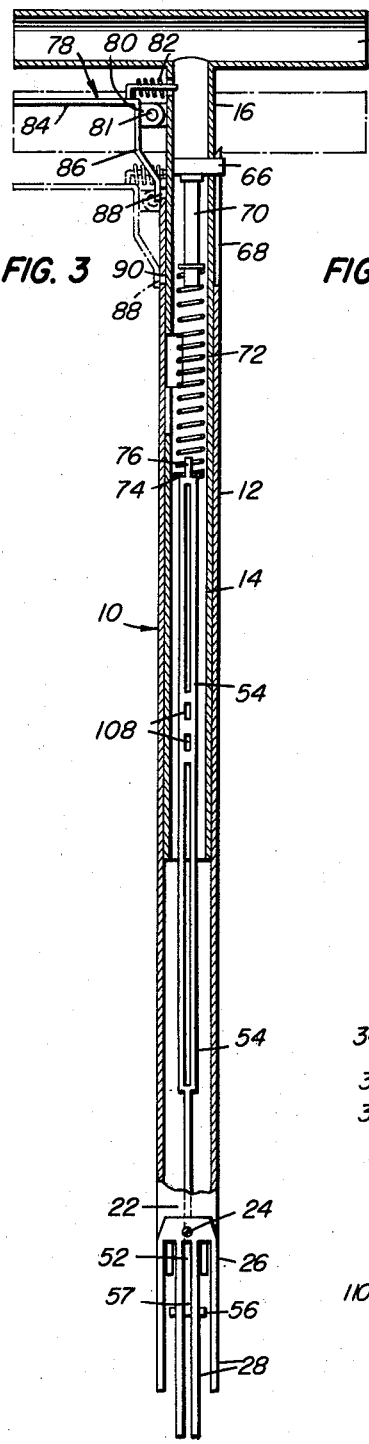
FIG. 3 is a sectional view on line 3—3 of FIG. 2.

There is shown at 10 the Lawn weed extractor and weed ejector implement of this invention. This implement 10 includes an outer tube 12 and an inner tube 14, this inner tube 14 having one end 16 extending beyond the adjacent end 18 of the outer tube 12. Transversely welded or otherwise secured across the end 16 of inner tube 14 is a handle 20, the inner tube 14 and handle 20 thus being T-shaped. The inner tube 14 is slidably moveable within the outer tube 12.

Rigidly secured along the end of one side 22 of the opposite end 32 of the outer tube 12 as by a screw 24 is the bifurcated base 25 of a fork 26 having extending tines 28, the base 25 of fork 26 being complementary to the outer surface of the inner and outer surfaces of the end of tube 12, thus curving the tines 28 about the tube 12, it being noted that the two inner tines are somewhat longer than the two outer tines.

Figure 5:
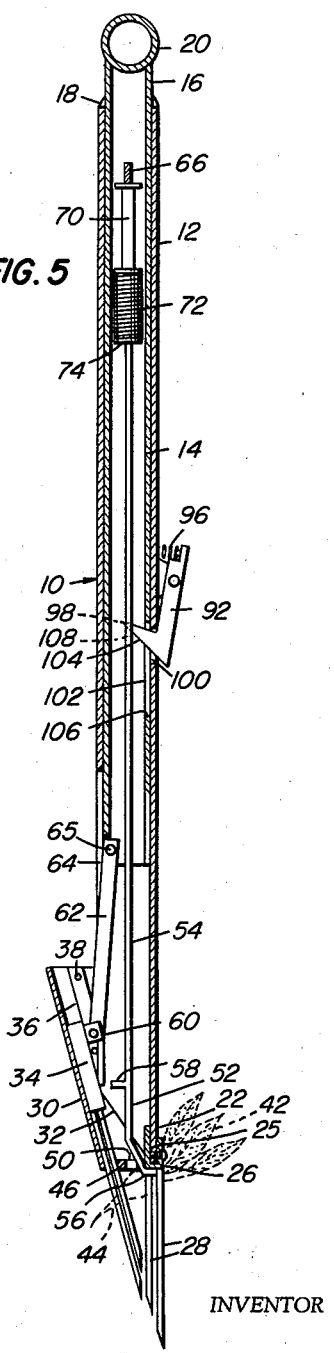
FIG. 5 is a sectional view similar to FIG. 4, but showing the position of the forks and ejector rod when holding an extracted weed.

A slanted rounded fork housing 30 is welded to the beveled end 32 of the outer tube 12 opposite the tube side 22. An extending and retractable fork 34 is slidably mounted in this fork housing 30 by two spaced apart guide rails 36 secured therein by screws 38, the slidable fork 34 being semi-circular in cross section, conplementary to the inner surface of the rounded housing 30. The slidable fork 34 is provided with five tines 40, as seen in FIG. 7, which likewise follow the curvature of the inner surface of the fork housing 30. The center tine is the longest, then the next two adjacent tines are somewhat shorter, and the outer two tines are the shortest. When the slidable fork 34 is fully extended as seen in FIG. 5, the tines of both forks will cooperate to readily grip a weed 42 and its roots 44.

Figure 4:
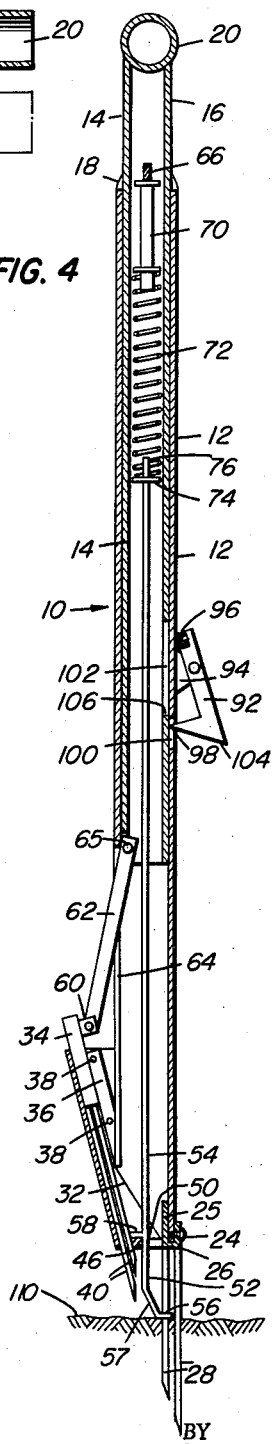
FIG. 4 is a sectional view on line 4—4 of FIG. 1.

Secured in the lower end of housing 30 is slidable fork tines guide 46, shaped as shown in FIG. 6, with five scalloped edges 48 acting as guides for the tines 40, while a concentric recess 50 acts as a guide for the end portion 52 of an ejector rod 54 extending axially through the center of inner tube 14. A transverse ejector foot 56 on the bent end 57 of ejector rod end portion 52 acts to push the weed 42 and its roots 44 off the fixed fork 26 when the slidable fork 34 has been retracted, and when the ejector rod is in advanced position, a stop finger 58 welded or otherwise secured thereto abuts the back side of tine guide 46 to limit the forward movement of ejector rod 54, as seen in FIG. 4. Rearward movement of ejector rod 54 is limited by the ejector rod transverse foot 56 abutting the bifurcated base 25 of fixed fork 26, as seen in FIG. 5.

The slidable fork 34 is provided on its back with a pair of ears 60 through which is pivotally connected one end of a link lever 62 whose other end extends through a slot 64 in outer tube 12, and is pivotally connected at 65 to the end of the inner tube 14. Adjacent the other end of tube 14 there is secured therethrough a guide finger 66 which extends through a longitudinally extending slot 68 in the outer tube 12 to permit relative axial movement of the tubes 12 and 14 but prevent relative rotary movement. Secured on a side of this same guide finger axially within the inner tube 14 is an axially extending spring base or rest 70, and biased at one end against this spring rest, and thus against the inner tube 14, is a biasing spring 72 whose other end is biased against a collar 74 mounted over the reduced neck end 76 of ejector rod 54. As a result, the spring 72 biases the ejector rod 54 and the inner tube 14 in opposite directions, the rod 54 toward the forked end of the implement 10, and the inner tube away from the forked end.

In order to permit latching both tubes against axial movement as well as to permit desired axial movement, a somewhat L-shaped lever 78 is povoted on ears 80 on end 16 of inner tube and biased by a spring 82 toward the tubes 12 and 14. One L-leg 84 extends close to handle 20, and on the end of the other L-leg 86 there is provided a pin 88 which abuts the end 18 of outer tube 12 to prevent relative axial movement. When lever L-leg 84 is squeezed toward the handle 20, the pin 88 is lifted, permitting the inner tube 14 to move into the outer tube 12, whereupon the L-leg 84 may be released to permit the pin 88 to enter the appropriately positioned hole 90 and latch the inner tube 12 in pressed-in position within outer tube 12 against the bias of the biasing spring 72 as shown in FIG. 5.

As the inner tube 14 is pushed into the outer tube 12, a dog 92 pivoted on ears 94 on outer tube 12 is biased by spring 96 to push its tooth 98 through a hole 100 in outer tube into and through a longitudinal slot 102 in the inner tube, the slot 102 being normally out of register with the hole 100 as seen in FIG. 4 until the inner tube 14 has been pushed into outer tube 12, as seen in FIG. 5. The back edge 104 of dog tooth 98 is rearwardly slanted, and when the pin 88 is withdrawn from latching hole 90, the inner tube 14 is pushed outwardly by biasing spring 72, and the end wall 106, hitting the rearwardly slanted edge 104 of dog tooth 98 kicks the dog tooth 98 out of the slot 102.

The ejector rod 54, which is biased outwardly by the same biasing spring 72, has one or two notches 108, which, when the ejector rod 54 is pushed into the tubes from the position shown in FIGS. 2 and 4 to the position shown in FIG. 5 by pressure of the ground surface 110 thereagainst, the dog tooth 98 extends through slot 106 in inner tube 14 into one notch 108, which is now in register therewith.

In operation, the implement is grasped by the handle 20 in the two hands, and, if necessary, the L-lever leg 84 is squeezed against handle 20 and then released so as to place pin 88 in abutting position behind the end 18 of outer tube 12 as shown in FIG. 1. The implement 10 is then pushed into the ground surface 110 of the lawn with the rigidly mounted fork 26 adjacent the weed 42 until the ejector rod transverse foot 56 hits the ground surface 110. Lever L-leg 84 is then squeezed toward handle 20, releasing pin 88 from abutting position behind the end 18 of outer tube 12, thus permitting inner tube 14 to move down within outer tube 14, against the bias of biasing spring 72, pushing the slidable fork 34 down into the ground surface 110 into gripping cooperation with the fixed fork 26, and as the handle 20 is thus pushed down, ejector rod transverse foot 56 will push against ground surface 110 to push ejector rod 54 inwardly against the bias of the same biasing spring 72 until the ejector foot 56 is stopped by abutting the securing edge of fixed fork 26 as illustrated in FIG. 5. This movement brings the ejector rod notch 108 and the inner tube longitudinal slot 102 into register with hole 100 in outer tube 12, whereupon spring 96 causes dog tooth 98 to enter through slot 102 into notch 108. At the same time, releasing pressure on lever leg 84 permits pin 88 to enter into latch hole 90 and latch the tubes 12 and 14 and thus keep the tines 40 of slidable fork 34 in cooperating gripping position with the tines 28 of the fixed fork 26.

The handle is then pulled by the two hands, pulling the weed 42 and its roots 44 from the ground surface 110 of the lawn. The forked end of the implement 10 is then placed over a suitable surface or receptacle, and the L-lever leg 84 is then squeezed against handle 20 unlatching the tubes. Biasing spring 72 then retracts inner tube 14 and through link lever 62 retracts slidable fork 34, releasing the weed 42 from gripping action with the fixed fork 26. As the inner tube 14 retracts, end wall 106 of longitudinal slot 102 hits the reverse slanted edge 104 of dog tooth 98, kicking it out of notch 108 in ejector rod 54 and out of slot 102 in inner tube 14. Biasing spring 72, which became compressed from its extended length as in FIG. 4 as the implement 10 is pushed into the ground surface 110 as above described, to the compressed length as shown in FIG. 5, immediately expands to forcibly move ejector rod from the position shown in FIG. 5, to the limit of its stop finger 58 hitting the back of guide 46, and forcibly discharges the weed 42 and root 44 from the fixed fork 26, and the inner tube 14 simultaneously moves to its limit as shown in FIG. 3, and pin 88 moves into abutting position behind outer tube end 18, thus making the implement 10 ready for pulling another weed in the same manner.

While the device has been shown and the structure described in detail, it is obvious that this invention is not to be considered as being limited to the exact form disclosed and changes in detail and construction may be made therein within the scope of what is claimed, without departing from the spirit of this invention.

Having thus set forth and disclosed the nature of this invention what is claimed is:

1. A lawn weed extractor and weed ejector implement comprising an outer tube, an inner tube slidable therewithin and extending at one end beyond said outer tube, a handle secured to and extending transversely of said extending inner tube end, a fork rigidly secured to one side of the other end of said outer tube, an inclined fork housing secured to the side of said outer housing opposite said rigidly mounted fork and slanted toward said rigidly mounted fork, an extendible and retractable fork slidably guided in said inclined fork housing toward the end of said rigid fork, a lever pivotally linked at one end to said slidable fork and at its other end through a longitudinal slot in said outer tube to the adjacent end of said inner tube, a weed ejector rod slidable within said inner tube and having an ejector end extendible between the tines of said forks, a stop means limiting the movement of said ejector rod in either direction, comperssion spring means biased between the other end of said ejector rod and said inner tube, a rearwardly inclined dog tooth pivoted on said outer tube and biased through an aperture therein to enter through a longitudinal slot in said inner tube to engage a holding notch in said ejector rod, said longitudinal slot and said ejector rod slot being in register only when ejector rod has first been moved, by pressing the implement against a lawn, to its inner limit against the biasing spring and then the inner tube has been moved, against the opposite side of said biasing spring to extend said slanted movable fork toward said rigid fork, a somewhat L-shaped lever pivoted on the extending side of said inner tube adjacent said handle and biased to urge one L-leg toward said tubes, the other L-leg being a handle leg adjacent but spaced from said inner tube handle, a pin on said one L-leg contacting said outer tube normally preventing relative movement of said inner tube into said outer tube, said pin being releasable from said outer tube contact to permit movement of said inner tube into said outer tube, and an aperture in said outer tube to receive said pin when said inner tube has moved into said outer tube against said biasing spring and latch said inner and outer tubes with said forks in weed gripping position for extracting a weed from the lawn, whereby movement of said L-lever handle leg toward said inner tube handle releases said pin from said outer tube, permitting said biasing spring to first extend said handle end of said inner tube from said outer tube, simultaneously withdraw said movable fork from said rigid fork to disengage the weed held therebetween, and cause the end wall of said longitudinal slot in said inner tube to abut said rearwardly inclined dog tooth and kick it out of said tube slot and said ejector rod notch, permitting said ejector rod, under bias action of said biasing spring, to eject the now released weed from the forks.

2. The implement of claim 1, and a guide finger secured transversely through said inner tube and extending into a guide slot in said outer tube.

3. The implement of claim 2, and a biasing spring rest based on said guide finger.

4. A lawn weed extractor and weed ejector implement comprising an outer tube, a digging fork rigidly secured to one end of said outer tube, an inner tube concentrically slidable within said outer tube, a handle member secured across an extending end of said inner tube, a guide finger secured within said inner tube adjacent its handle end and extending through a side thereof into a longitudinal guide slot in said outer tube, a spring rest mounted on said guide finger within said inner tube, a spring biased against said spring rest, an ejector rod within said inner tube having one end biased against said biasing spring, a fork housing secured on said outer tubular member opposite said digging fork and rigidly mounted thereon, said housing being slanted toward the end of said rigid mounted digging fork, an extendible and retractable fork slidably mounted in guide means secured in said housing, the other end of said ejector rod extending between said forks, a link lever pivoted to said slidably mounted fork at one end and to said inner tube at its other end, stop means in said implement limiting the movement of said ejector rod in both directions, a dog pivoted on said outer tube, said dog having a rearwardly slanted tooth biased to extend through a hole in said outer tube and through a longitudinal slot in said inner tube, said slot being normally biased out of register therewith, and into a slot in said ejector rod in register therewith only when said ejector rod has been retracted into said inner tube against the bias of said biasing spring and said inner tubular member has also moved in a spring biasing and slidable fork extending direction, a somewhat L-shaped lever pivoted to said inner tube beyond its end adjacent said handle thereon, one leg of said L-lever being adjacent said handle and the other leg adjacent said tubes, said other leg of said lever being biased toward said tubes, a pin on said other leg normally abutting the end of said outer tube, said L-lever being movable to raise said pin from the path of said outer tube permitting said inner tube to be pushed into said outer tube against the bias of said biasing spring, said outer tube having a lever pin receiving hole to hold said inner tube latched to said outer tube in pushed-in position, whereby pressing said handle to press said rigid mounted fork into the lawn adjacent a weed with said L-lever pin abutting said outer tube end causes said rigid fork to penetrate the lawn and retract said ejector rod against said biasing spring, and then pivoting said L-lever against its bias and further pressing said handle causes said linking lever to extend said extendible fork to weed gripping position in cooperation with said rigidly mounted fork and bring said inner tubular member slot and said ejector rod notch into register with said dog tooth to hold said ejector rod in retracted position while the weed is being extracted, and then when said L-lever pin is pivoted away from said outer tubular member pin receiving hole, said ejector rod biasing spring moves said inner tubular member out of said outer tubular member to retract said extended fork from weed holding position with said rigid fork and the end wall of said dog slot in said inner tube kicks said dog tooth out of said ejector rod notch to permit said biasing spring to actuate said ejector rod in a weed ejecting direction.

<p style="text-align:center">No references cited.</p>